May 21, 1929.　　　　O. J. KUEPFER　　　　1,714,426
COINCIDENTAL IGNITION AND STEERING WHEEL LOCK
Filed Aug. 18, 1925　　　4 Sheets-Sheet 4
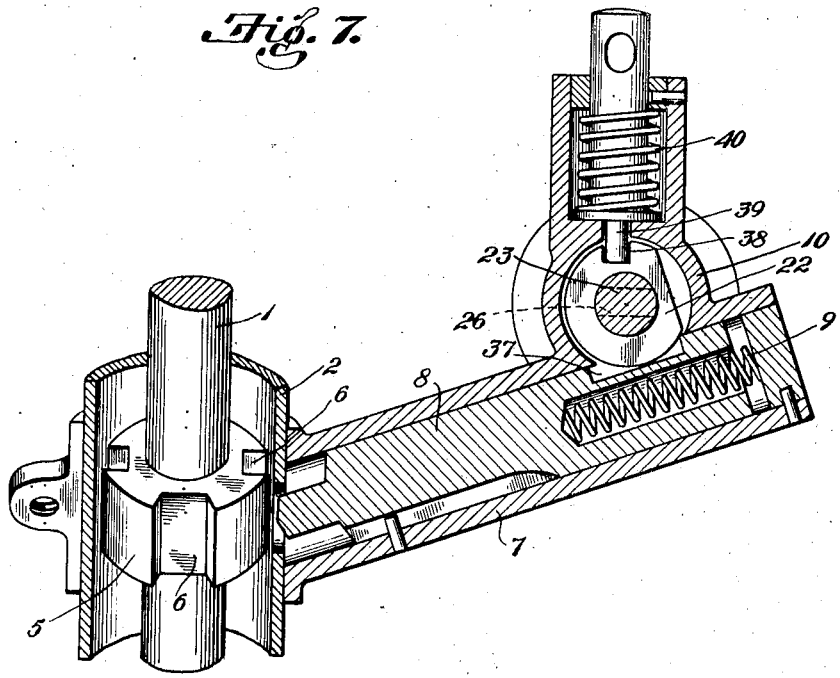
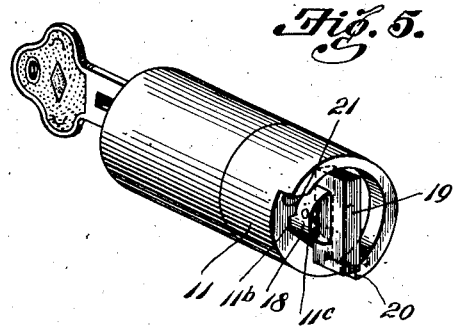
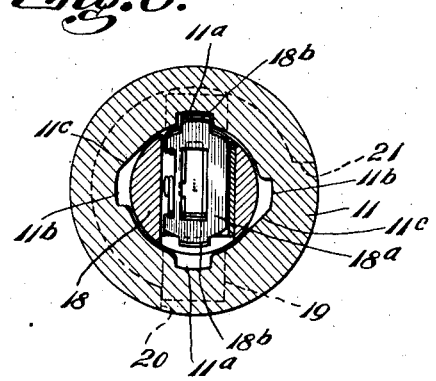
Inventor
Otto J. Kuepfer.
By Frease and Bond
Attorneys.

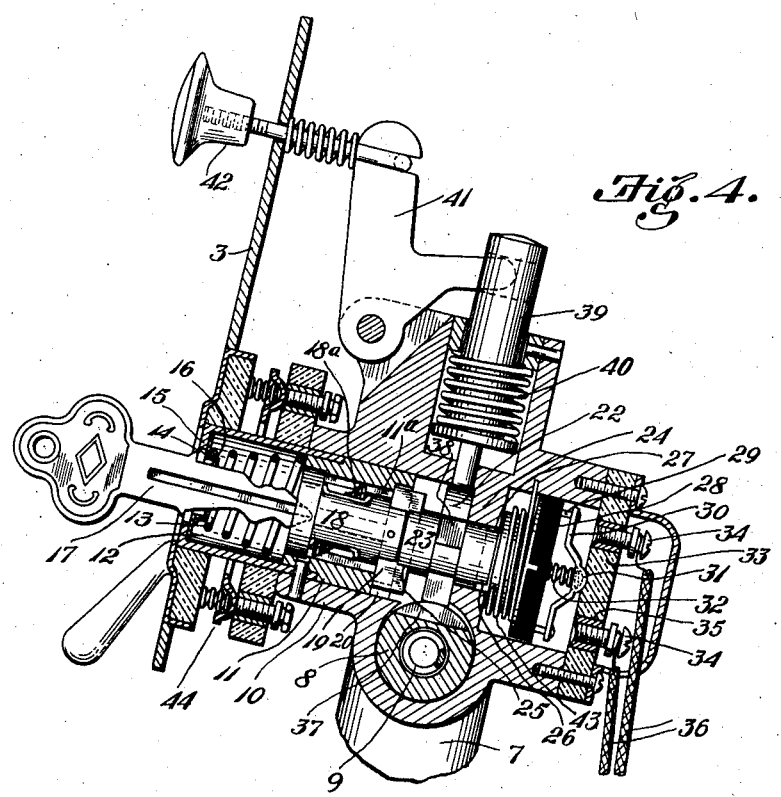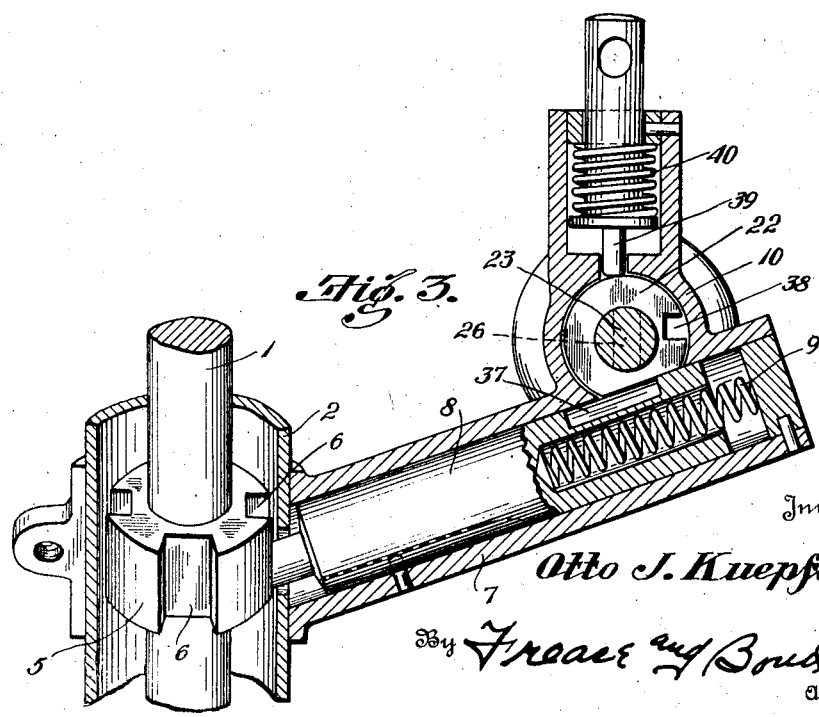

Patented May 21, 1929.

1,714,426

UNITED STATES PATENT OFFICE.

OTTO J. KUEPFER, OF SPENCER, OHIO.

COINCIDENTAL IGNITION AND STEERING-WHEEL LOCK

Application filed August 18, 1925. Serial No. 50,938.

This invention relates to mechanism for locking the steering wheel of an automobile and simultaneously operating a switch in the ignition circuit; and the object of the improvement is to provide a key operated locking mechanism located in a convenient position, preferably upon the instrument board of the automobile, and arranged to unlock the steering wheel for operation, and turn the ignition switch to closed position, by actuation of a key; and to be operated by a manually controlled latch bolt to lock the wheel against rotation and open the ignition switch, without the use of the key, means being provided in the lock mechanism for automatically ejecting the key immediately upon the unlocking of the mechanism and rendering the key inoperative by an operation of the latch bolt.

Still further objects will hereinafter appear in the description and claims to follow wherein this invention is represented as consisting of a certain construction and arrangement of parts, of which one exemplification is shown in the accompanying drawings, in which—

Figure 1:
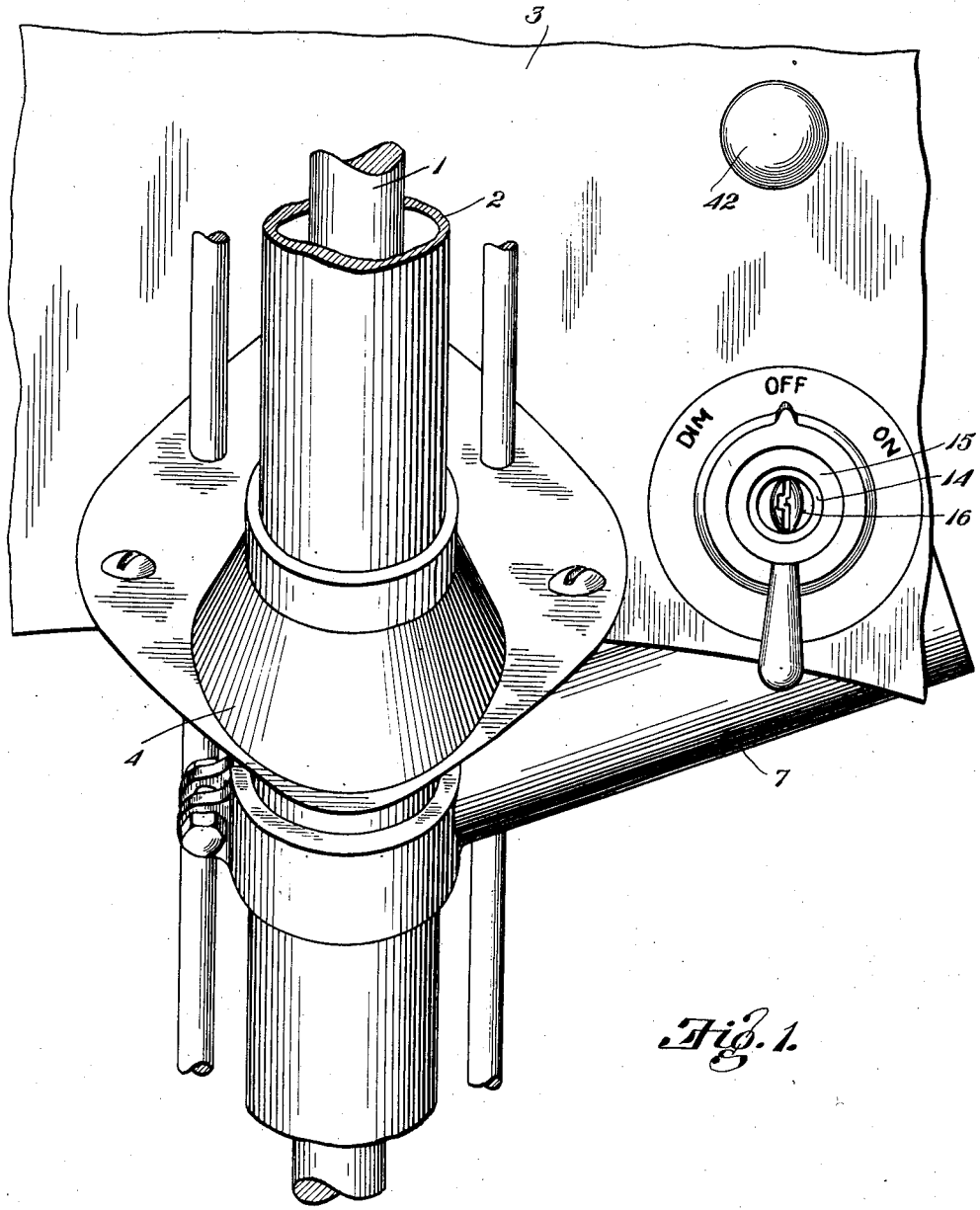
Figure 2:
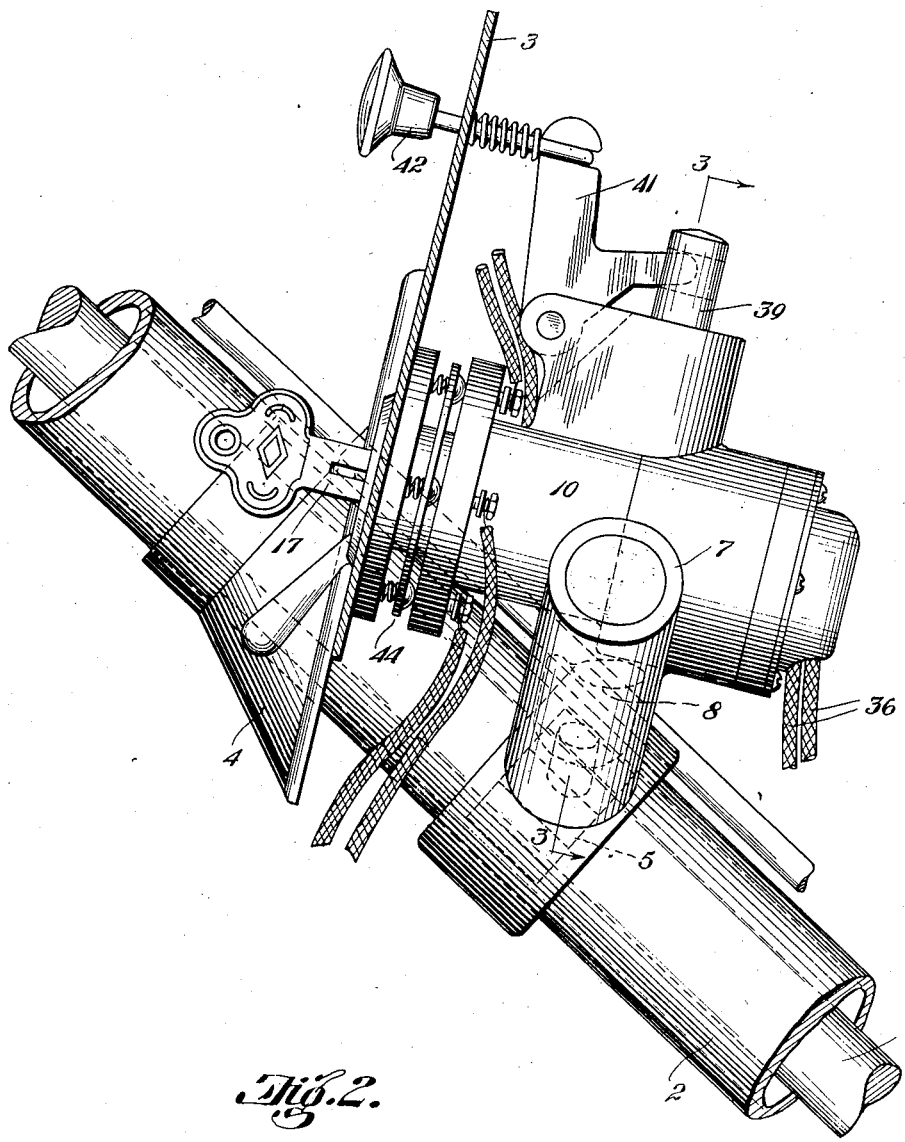

Figure 1 is a fragmentary view of the improved locking mechanism as viewed from the driver's seat;

Fig. 2, a side elevation of the same;

Fig. 3, a section on the line 3—3, Fig. 2;

Fig. 4, a longitudinal section through the lock mechanism;

Fig. 5, a detached perspective view of the lock,

Fig. 6, a transverse sectional view of the same, and

Fig. 7, a view similar to Fig. 3, showing the locking bolt withdrawn.

Similar numerals of reference indicate corresponding parts throughout the drawings.

The steering post 1 is mounted within the usual jacket 2, supported upon the instrument board 3 as by the bracket 4, and is provided, at a point beneath the bracket, with a collar 5, having one or more notches, slots or grooves 6 in its periphery.

The locking mechanism to which the invention pertains is carried in a case having a tubular portion 7 communicating with the jacket 2, adjacent to the collar 5, a spring pressed locking bolt 8 being located therein and arranged to be normally protruded into one of the grooves 6 of the collar, by means of the coil spring 9.

A cylindrical portion 10 of the case may be located at right angles to the tubular portion 7 thereof and extends through the instrument board 3. A cylindric lock 11 is mounted within this portion of the case, and is provided at its outer end portion with a chamber 12, in which is located a coil spring 13 arranged to normally urge the flanged disk 14 outward against the annular flange 15 of the chamber case. This disk is provided with an opening 16 to receive the shank of a key 17 designed to operate the lock, it being necessary for the coil spring to be compressed by insertion of the key, in order to enter the key into the lock.

This construction provides an automatic key ejector for the lock, as it will be seen that when manual pressure upon the key is released, the spring 13 will expand to its normal position, moving the disk 14 back into contact with the annular flange 15 and throwing the key out of the lock.

The barrel 18 of the lock is rotatable within the cylindric lock case 11, and is provided at its inner end with the lug 19 arranged to engage the shoulders 20 and 21 formed in the end of the lock case 11, to limit the movement of said barrel each way, as to a quarter turn.

The lock barrel is provided with a plurality of tumblers or plates $18^a$, having diametrically disposed lugs $18^b$, for engagement with the grooves $11^a$ and $11^b$, in the lock case. Each groove $11^b$ is cut away at an angle upon one side, as shown at $11^c$, to permit the lock barrel to be turned back to the locked position without the use of a key.

A latch cam 22 is rotatably mounted within the cylindric portion 10 of the case and is provided with an axial stem 23, the inner end of which is journaled in the partition wall 24 of the case. The outer end of the stem is provided with a notch 25 which receives the lug 19 of the lock barrel, and the inner end thereof is provided with a similar notch 26 which receives a lug 27 upon the rotatable insulated switch block 28 of the ignition switch.

This block is provided with pins 29, upon which is slidably mounted a metal disk 30, having contact lugs 31, and coil springs 32 normally urging the disk outward against the heads of the pins.

The inner end of the cylindric portion 10 of the case is closed by an insulated plate 33, through which is located a pair of binding posts 34, mounted in the plate as by the bushings 35. The wires 36 of the ignition circuit are connected to these two binding posts, which are arranged to be contacted with by the lugs 31 upon the disk 30 when the same is turned to the operative position.

The latch cam 22 is arranged to be received in the groove 37 formed in the locking bolt 8, and is provided with a notch 38 arranged to be engaged by a latch bolt 39 to normally retain the locking bolt in unlocked position to permit the steering wheel to be operated, a coil spring 40 normally holding the latch bolt in locked position.

The end of the latch bolt extends upward and is operatively connected to the bell crank 41 arranged to be operated by the latch bolt pull rod 42, which is located through the instrument board and adapted to be pulled outward, to release the latch bolt and permit the coil spring 43 to rotate the latch cam, and with it the lock cylinder and switch block 28, a quarter turn.

The switch 44, which controls the light circuit of the automobile, may be located around the cylinder lock case 11 for the purpose of convenience of operation, although there is no operative connection between this light switch and the locking mechanism above described.

In operating the mechanism, assuming the parts are in the position shown in Figs. 1, 2, 3 and 4, with the wheel locked against rotation, and the ignition circuit open, the key is inserted into the lock and given a quarter turn, operating the ignition switch to close the circuit and turning the latch cam 22 to withdraw the locking bolt 8 from engagement with the notched collar 5 upon the steering column. The latch bolt 39 will engage the notch 38 of the latch cam, holding the parts in operative position, permitting the steering wheel to be operated and the ignition circuit to remain closed. The key will be automatically ejected from the lock by the key ejecting means illustrated in Fig. 4, and above described, making it necessary for the driver to replace the key in his pocket or other place of safety, unless by gross negligence he permits the key to drop upon the floor of the car and remain there.

When it is desired to leave the car it is not necessary for the driver to take out the key and insert it into the lock in order to lock the steering wheel and open the ignition circuit, it being only necessary for him to pull the latch bolt outward, releasing the latch cam, which will be immediately rotated, a quarter turn, by means of the spring 43, opening the ignition switch and setting the lock in normal position in which it can be operated only with the key. The spring 9 immediately forces the locking bolt 8 into engagement with the notched collar 5 of the steering post, and in the event the locking bolt does not register with one of the notches 6 thereof, it will be seen that a slight turning of the steering wheel will cause the locking bolt to immediately register or engage in one of the notches 6, thus locking the steering wheel against operation.

It is not only unnecessary but impossible to use the key to lock the mechanism, because the latch bolt engages the notch in the cam 22 preventing rotation of the cam and lock barrel until the latch bolt is released from engagement with the notch in the cam by an outward pull upon the latch bolt pull.

This application is a continuation of the common subject matter of my copending application Serial No. 746,015 for combined steering wheel and ignition locks, filed October 27, 1924.

I claim:

1. In combination with a steering post and an ignition switch, a coincidental locking mechanism for simultaneously operating the ignition switch and controlling the operation of the steering post, key operated means for operating said locking mechanism to unlock the steering post, close the ignition switch and render the key inoperative, and manually operated means for locking the steering post, opening the ignition switch and rendering the key operative.

2. In combination with a steering post and an ignition switch, a coincidental locking mechanism for simultaneously operating the ignition switch and controlling the operation of the steering post, key operated means for operating said locking mechanism to unlock the steering post, close the ignition switch and eject the key, and manually operated means for locking the steering post and opening the ignition switch.

3. In combination with a steering post having a notch therein, and an ignition switch, a coincidental locking mechanism including a spring pressed locking bolt for normally engaging said notch, a latch cam for moving said locking bolt out of engagement with said notch, a key operated lock for rotating said cam, and a latch bolt for engagement with the cam.

4. In combination with a steering post having a notch therein, and an ignition switch, a coincidental locking mechanism including a spring pressed locking bolt for normally engaging said notch, a latch cam for moving said locking bolt out of engagement with said notch, a key operated lock for rotating said cam in one direction, a latch bolt for engagement with the cam, and means for rotating the cam in the other direction when the latch bolt is disengaged therefrom.

5. In combination with a steering post, a locking mechanism for controlling the operation of the steering post, key operated means for operating said locking mechanism to unlock the steering post, means for ejecting the key when the steering post is unlocked, means for rendering the key inoperative when the steering post is unlocked, and manually operated means for locking the steering post and rendering the key operative.

6. In combination with a steering post and an ignition switch, a coincidental locking mechanism for simultaneously operating the ignition switch and controlling the operation of the steering post, key operated means for operating said locking mechanism to unlock the steering post and close the ignition switch, a latch bolt for holding the steering post in unlocked position and the ignition switch in closed position and means for manually releasing said latch bolt to lock the steering post and open the ignition switch.

7. In combination with a steering post and an ignition switch, a coincidental locking mechanism for simultaneously operating the ignition switch and controlling the operation of the steering post, key operated means for operating said locking mechanism to unlock the steering post and close the ignition switch, a latch bolt for holding the steering post in unlocked position and the ignition switch in closed position and a pull rod operatively associated with the latch bolt for manually releasing the latch bolt to lock the steering post and open the ignition switch.

8. In combination with a steering post and an ignition switch, a coincidental locking mechanism for simultaneously operating the ignition switch and controlling the operation of the steering post, key operated means for operating said locking mechanism to unlock the steering post and close the ignition switch, a latch bolt for holding the steering post in unlocked position and the ignition switch in closed position and a bell-crank operatively connected to the latch bolt and a pull rod associated with the bell-crank for releasing the latch bolt to lock the steering post and open the ignition switch.

9. In combination with a steering post having a notch therein and an ignition switch, a coincidental locking mechanism for simultaneously operating the ignition switch and controlling the operation of the steering post, said locking mechanism including a locking bolt for engagement with the notch in the steering post, a spring for normally protruding said locking bolt into said notch, a cam for withdrawing the locking bolt from said notch, said cam being operatively associated with the ignition switch, key operated means for rotating the cam to withdraw the locking bolt, a latch bolt for engagement with the cam to hold the locking bolt in retracted position, manual means for releasing the latch bolt and means for rotating the cam to permit the locking bolt to engage said notch when the latch bolt is released.

In testimony that I claim the above, I have hereunto subscribed my name.

OTTO J. KUEPFER.